(12) United States Patent
Yano

(10) Patent No.: US 8,436,585 B2
(45) Date of Patent: May 7, 2013

(54) POWER SUPPLY DEVICE

(75) Inventor: Junya Yano, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 266 days.

(21) Appl. No.: 12/903,464

(22) Filed: Oct. 13, 2010

(65) Prior Publication Data

US 2011/0089905 A1    Apr. 21, 2011

(30) Foreign Application Priority Data

Oct. 16, 2009  (JP) ................. 2009-239522

(51) Int. Cl.
*H02J 7/00*    (2006.01)
(52) U.S. Cl.
USPC .......................... 320/132; 320/104
(58) Field of Classification Search .................. 320/104, 320/132
See application file for complete search history.

(56) References Cited

U.S. PATENT DOCUMENTS

| | | | |
|---|---|---|---|
| 6,100,666 A * | 8/2000 | Ryu | 320/132 |
| 6,304,061 B1 | 10/2001 | Toya | |
| 2009/0091299 A1 | 4/2009 | Lin et al. | |
| 2010/0131137 A1 | 5/2010 | Iida | |

FOREIGN PATENT DOCUMENTS

| | | |
|---|---|---|
| DE | 199 57 289 | 5/2000 |
| DE | 10 2009 007294 | 8/2010 |
| JP | 2008-312381 | 12/2008 |

OTHER PUBLICATIONS

European Search Report (in English language) issued Feb. 25, 2011 in corresponding European Patent Application No. 10 01 3709.

* cited by examiner

*Primary Examiner* — Samuel Berhanu
(74) *Attorney, Agent, or Firm* — Wenderoth, Lind & Ponack, L.L.P.

(57) ABSTRACT

When remaining capacity estimated by a calculator is higher than a control upper limit, a charge-disabled mode is selected in which charging operation is disabled. When remaining capacity is lower than a control lower limit, a discharge-disabled mode is selected in which discharging operation is disabled. When remaining capacity is higher than an upper limit of a given range having its center at a target value specified between the control upper and lower limits, an allowance mode is selected in which charging/discharging current limits are adjusted to allow a discharging amount to exceed a charging amount in a predetermined period. When remaining capacity is not higher than the upper limit of the range, a restriction mode is selected in which charging/discharging currents are restricted so that the remaining capacity is held within the range.

12 Claims, 8 Drawing Sheets

POWER SUPPLY DEVICE

BACKGROUND OF THE INVENTION

1. Field of the Invention

The present invention relates to a power supply device that controls the connection state between a load and a battery pack that is composed of a plurality of rechargeable batteries. In particular, the present invention relates to a controller that controls the connection state between a battery pack and an inverter in electric vehicles. Examples of such electric vehicles can be provided by battery electric vehicle (BEV), hybrid electric vehicle (HEV), hybrid electric vehicle including fuel cells and rechargeable batteries. Such electric vehicles convert DC electric power into AC electric power by means of an inverter, and provide the converted electric power to an electric motor. The DC electric power is provided from a battery pack as a driving power source installed on the electric vehicles.

2. Description of the Related Art

In recent years, in consideration of environmental issues, hybrid electric vehicles have been commercially practical that are driven by an efficient combination of internal-combustion engine and electric motor. Hybrid electric vehicles include a rechargeable battery pack. The battery pack provides electric power to the electric motor in start, acceleration and the like, and retrieves vehicle kinetic energy as electric power in downhill, breaking and the like.

A hybrid electric vehicle has been proposed that includes a configuration that allows the included battery pack to be charged with electric power provided from external power sources such as commercial power. In this hybrid electric vehicle, in the case where the battery pack is previously charged by external power sources, the vehicle can be driven for a relatively short distance, such as in driving to and from work or for shopping, with its internal-combustion engine being stopped. As a result, it is possible to improve the total fuel consumption efficiency of the vehicle. Such a drive mode is also referred to as an EV (Electric Vehicle) drive mode.

In order to improve drive performance in this EV drive mode, it is preferable to increase the charging/discharging performance of the battery pack. Since battery packs deteriorate due to over-discharged operation, over-charged operation, and the like, it is important that battery packs are held within a proper range of remaining capacity (also referred to as State Of Charge (SOC), battery charge amount, charge state value and the like, and hereinafter occasionally referred to as "SOC").

Japanese Patent Laid-Open Publication No. 2008-312381 proposes a method that improves the estimation accuracy of SOC of a storage battery. According to this method, as shown in FIG. 8, first, a vehicle starts running in an EV drive mode (time t1).

In the EV drive mode, when a reset request for a first power storage unit BAT1 (SOC1 reset request) is issued, current control is performed to discharge actively the first power storage unit BAT1. After time t2 when charging by an external power supply becomes allowed, a discharge current of the first power storage unit BAT1 to be reset is kept at a given current value, and a second power storage unit BAT2 not to be reset is charged with a charge current including at least the discharge current of the first power storage unit BAT1. When a distinctive point appears on a battery voltage characteristic of the first power storage unit BAT1 at a subsequent time t3, an estimated value of an SOC of the first power storage unit BAT1 is reset to a predetermined reference value. This control can improve the estimation accuracy of SOC of the power storage unit.

However, estimation accuracy of SOC is limited. For this reason, switching accuracy between BEV and HEV drive modes in accordance only with calculated SOC is limited. In particular, even if an error between the calculated value of SOC and actual SOC is small, errors are accumulated over a long period of use. Accordingly, the accumulated error will be large. If accumulated error of the calculated values of SOC becomes large, precise control will be difficult. Imprecise charging/discharging operation control may affect the battery pack. This increases the risk of battery life deterioration.

The present invention is aimed at solving the problem. It is a main object of the present invention to provide a power supply device capable of changing a charging/discharging current limit values at appropriate timing whereby reducing the adverse effect on a battery pack.

SUMMARY OF THE INVENTION

To achieve the above object, a power supply device according to a first aspect of the present invention includes a rechargeable battery pack, a charging/discharging control portion, a current detecting portion, a battery capacity calculating portion. The charging/discharging control portion controls charging/discharging operation of the battery pack. The current detecting portion detects charging/discharging currents flowing in the battery pack. The battery capacity calculating portion estimates the remaining capacity of the battery pack based on the charging/discharging currents detected by the current detecting portion. The charging/discharging control portion selects one of a plurality of control modes. The charging/discharging operation is controlled based on the selected control mode. When the remaining capacity estimated by the battery capacity calculating portion is higher than a predetermined control upper limit, a charging operation disabled mode is selected so that the charging operation is disabled. When the estimated remaining capacity is lower than a control lower limit specified lower than the control upper limit, a discharging operation disabled mode is selected so that the discharging operation is disabled. When the estimated remaining capacity is higher than an upper limit of a given range having its center at a target state value specified between the control upper and lower limits, an allowance mode is selected in which charging/discharging current limit values are adjusted to current values that allow a discharging amount to exceed a charging amount in a predetermined period. When the estimated remaining capacity is lower than the upper limit of the given range, a restriction mode is selected in which charging/discharging currents are restricted so that the remaining capacity is held within the given range having its center at the target state value. According to this power supply device, since the control modes for controlling charging/discharging currents are thus selected in accordance with the remaining capacity, appropriate operation is achieved. In addition, it is possible to prevent the battery pack from being over-charged/over-discharged, and to provide the battery pack with a long life.

In a power supply device according to a second aspect of the present invention, the charging/discharging control portion can adjust the charging/discharging current limit values in the allowance mode to current values that allow the integrated value of the discharging current in the predetermined period to exceed the integrated value of the charging current. According to this power supply device, since the discharging current is allowed to be larger than the charging current in the allowance mode, it is possible to effectively use the battery pack within a range in which the battery pack is not over-charged/over-discharged.

In a power supply device according to a third aspect of the present invention, the charging/discharging control portion can control charging/discharging operation so that the time variation amount of the discharging current is larger than the time variation amount of the charging current in the allowance mode. According to this power supply device, since the discharging current is allowed to be larger than the charging current in the allowance mode, it is possible to effectively use the battery pack within a range in which the battery pack is not over-charged/over-discharged.

In a power supply device according to a fourth aspect of the present invention, the charging/discharging control portion can control charging/discharging operation so that the time variation amount of the discharging current in the restriction mode is smaller than the time variation amount of the discharging current in the allowance mode. According to this power supply device, since the discharge amount in the restriction mode is suppressed as compared with the allowance mode, it is possible to prevent the battery pack from being over-discharged and to protect the battery pack.

A power supply device according to a fifth aspect of the present invention can further include a power supply side communicating portion that transmits the charging/discharging current limit values based on the remaining capacity of the battery pack estimated by the battery capacity calculating portion to a device side to be provided with electric power. This power supply device can provide notification of an available current amount depending on the control modes on the power supply device side to the device side to be provided with electric power. For example, after it is detected that the remaining capacity is lower than the upper limit of the given range, the power supply side communicating portion notifies the device side that the charging/discharging current limit values are restricted to small values capable of holding the target state value.

A power supply device according to a sixth aspect of the present invention can further include an external-connecting switch that can electrically connect the battery pack to an external charging device. According to this power supply device, a battery pack can be charged not only by another battery pack included in the power supply device but also by an external power supply device.

In a power supply device according to a seventh aspect of the present invention, the power supply device can be a vehicle power supply device. In this case, the allowance mode is an EV drive mode, and the restriction mode is an HEV drive mode. According to this power supply device, the EV drive mode and the HEV drive mode can be switched from one to the other at appropriate timing in so-called plug-in hybrid electric cars so as not to adversely affect the battery pack. Therefore, the battery pack can be reliably used for the long term.

In a power supply device according to an eighth aspect of the present invention, the control upper limit can be not less than 80% of the fully-charged capacity of the battery pack.

In a power supply device according to a ninth aspect of the present invention, the target state value cannot be more than 50% of the fully-charged capacity of the battery pack.

According to this power supply device, drive modes can be selected to keep SOC at about 50%, which is suitable particularly to an HEV drive mode.

Therefore, this power supply device is effective for EV, plug-in control.

In a power supply device according to a tenth aspect of the present invention, the restriction upper limit can be 20 to 60 Ah.

In a power supply device according to an eleventh aspect of the present invention, the target state value can be 2 to 10 Ah.

The above and further objects of the present invention as well as the features thereof will become more apparent from the following detailed description to be made in conjunction with the accompanying drawings.

DETAILED DESCRIPTION OF THE EMBODIMENT(S)

Figure 1:
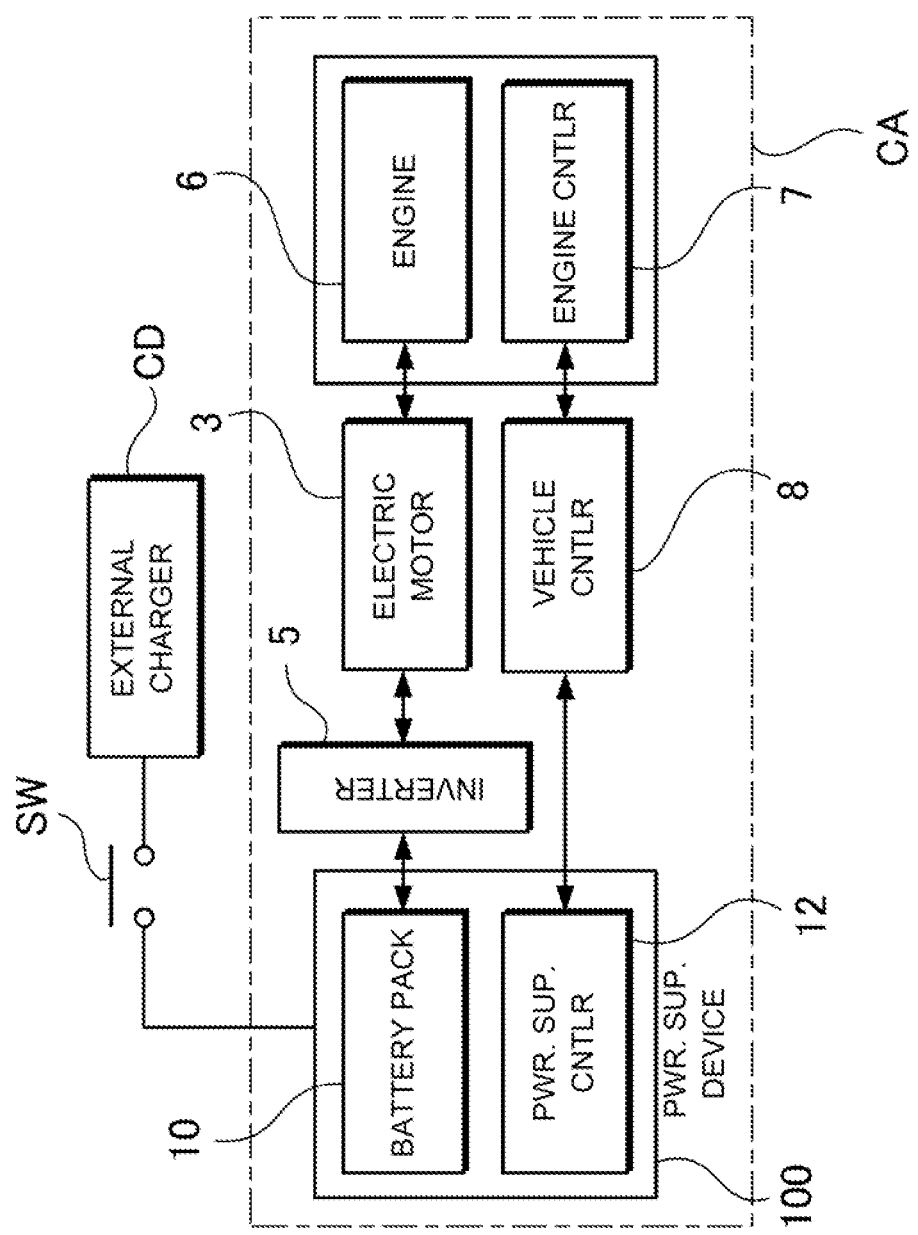
FIG. 1 is a block diagram showing a vehicle that includes a power supply device according to a first embodiment.

The following description will describe embodiments according to the present invention with reference to the drawings. It should be appreciated, however, that the embodiments described below are illustrations of a power supply device and a method for controlling charging/discharging operation of a power supply device to give a concrete form to technical ideas of the invention, and a power supply device and a method for controlling charging/discharging operation of a power supply device of the invention are not specifically limited to the description below. Furthermore, it should be appreciated that the members set forth in the claims attached hereto are not specifically limited to the members in the exemplary embodiments. Unless otherwise specified, any dimensions, materials, shapes and relative arrangements of the members described in the embodiments are given as an example and not as a limitation. Additionally, the sizes and the positional relationships of the members in each of drawings are occasionally shown larger exaggeratingly for ease of explanation. Members that are the same as or similar to those of this invention are identified with the same designation and the same reference numerals, and their description is omitted. In addition, a plurality of structural elements of the present invention may be configured as a single part that serves the purpose of a plurality of elements; on the other hand, a single structural element may be configured as a plurality of parts that serve the purpose of a single element. Also, the description of some of the examples or embodiments may be applied to other examples, embodiments or the like.

Figure 2:
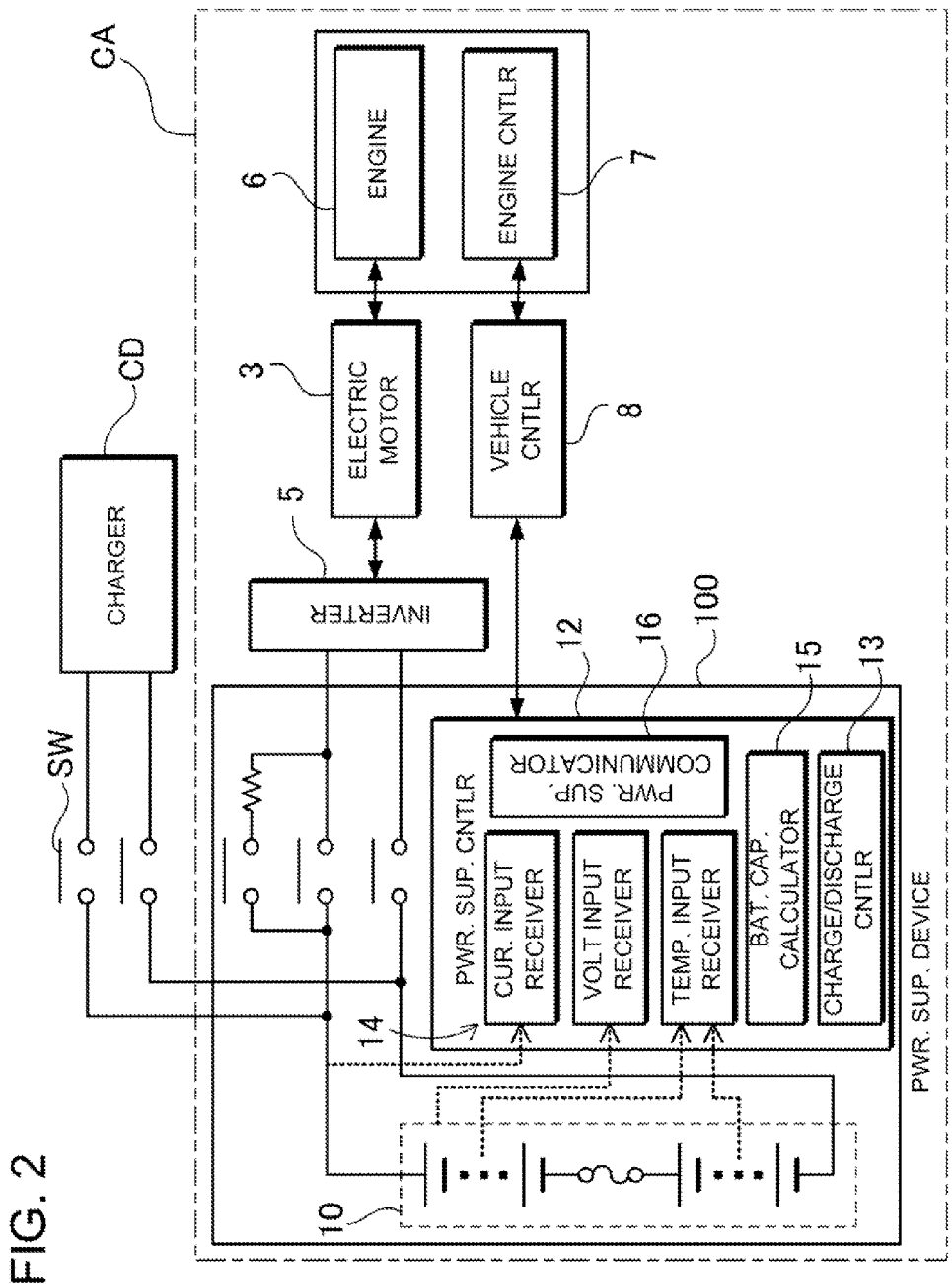
FIG. 2 is a detailed block diagram of the vehicle shown in FIG. 1.
Figure 3:
FIG. 3 is a graph showing SOC time variation in a method for controlling charging/discharging operation of the power supply device.
Figure 4:
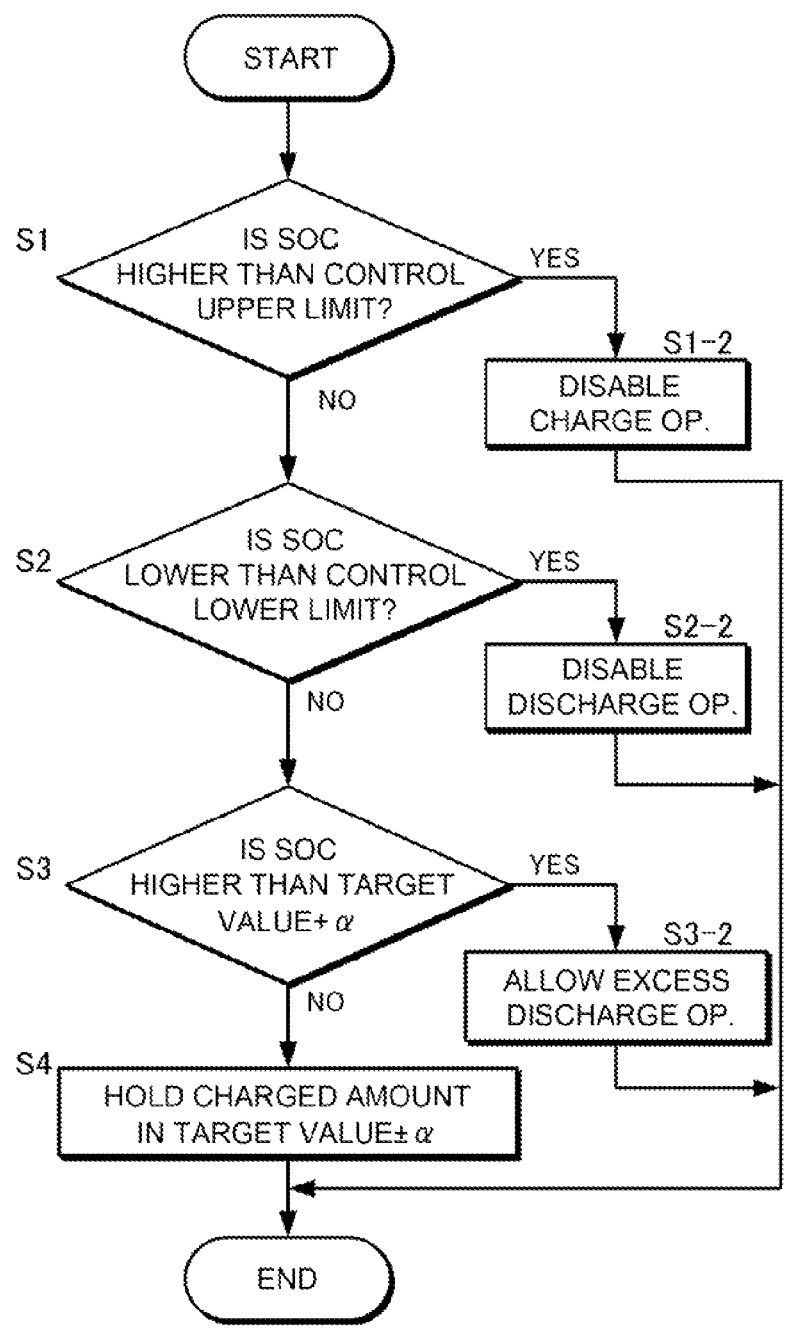
FIG. 4 is a flow chart of the charging/discharging control method.
Figure 5:
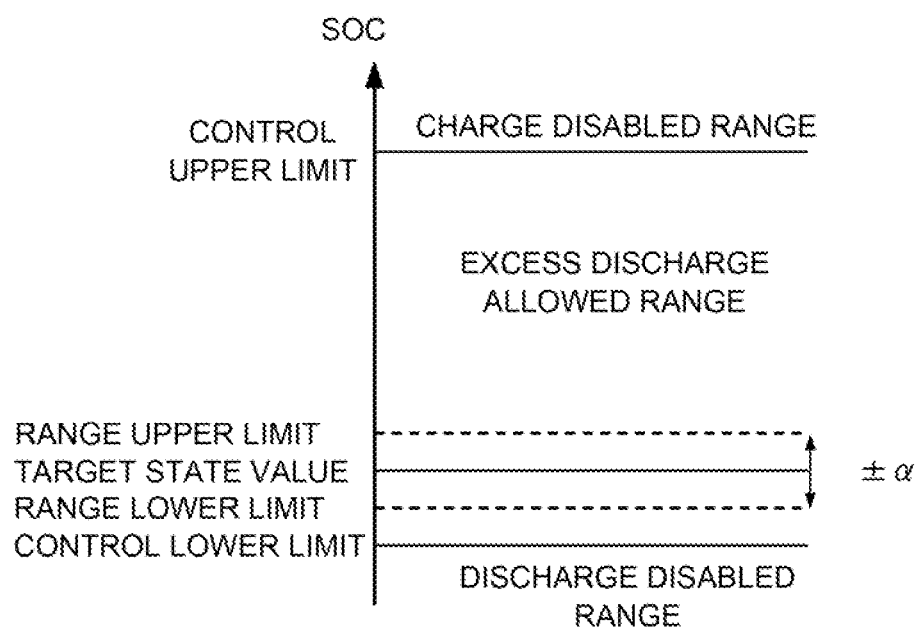
FIG. 5 is a view schematically showing the relationship of predetermined limits.

The following description will describe a power supply device 100 and a charging/discharging control method according to a first embodiment with reference to FIGS. 1 to 5. The power supply device 100 according to this embodiment is included in a vehicle (hybrid car) CA. FIG. 1 is a block diagram showing the vehicle CA that includes the power supply device 100 according to the first embodiment. FIG. 2 is a detailed block diagram of the vehicle CA shown in FIG. 1. FIG. 3 is a graph showing SOC time variation in the method for controlling charging/discharging operation of the power supply device 100. FIG. 4 is a flow chart of the charging/discharging control method. FIG. 5 is a view schematically showing the relationship of predetermined limits. The illustrated power supply device 100 includes a rechargeable battery pack 10, and a power supply controller 12 that controls the power supply device 100. The power supply device 100 includes a battery system that provides driving electric power to an electric motor 3 in the vehicle CA.

As shown in FIG. 2, the power supply controller 12 serves as a charging/discharging control portion 13, a current detecting portion 14, a battery capacity calculating portion 15, and a power supply side communicating portion 16. The charging/discharging control portion 13 controls charging/discharging operation of the battery pack 10. The current detecting portion 14 detects charging/discharging currents flowing in the battery pack 10. The battery capacity calculating portion 15 estimates the remaining capacity of the battery pack 10 based on the charging/discharging currents detected by the current detecting portion 14. The power supply side communicating portion 16 transmits the charging/discharging current limit values based on the remaining capacity of the battery pack 10 estimated by the battery capacity calculating portion 15 to a device side to be provided with electric power (i.e., vehicle main unit).

As shown in FIG. 1, the vehicle CA includes an inverter 5, an electric motor 3, an engine 6, an engine controller 7, and a vehicle controller 8. The inverter 5 converts DC electric power provided from the power supply device 100 into AC electric power. The electric motor 3 is driven by the AC electric power converted by the inverter 5 and by power of the engine 6. The engine 6 drives the electric motor 3 and wheels. The engine controller 7 controls operation of the engine 6. The vehicle controller 8 controls operation of the vehicle CA.

1. Vehicle Controller 8

The vehicle controller 8 controls distribution of gasoline engine output and output from the power supply device 100 based on output requirement. The vehicle controller 8 is connected to and can communicate with the power supply controller 12. Thus, the vehicle controller 8 can receive information including SOC of the battery pack 10 (battery SOC value), available charging/discharging current limit values and the like from the power supply controller 12, and can send output requirement and the like to the power supply controller 12. When the battery SOC value is high, the vehicle controller 8 increase output distribution to the power supply device 100. In this case, an EV drive mode is selected in which output distribution to the engine is suppressed. In the EV drive mode, the power supply controller 12 allows the amount of a discharging current from the battery pack 10 to exceed the amount of a charging current to the battery pack 10 until the SOC value becomes not more than a predetermined value. When the power supply controller 12 detects that the SOC value decreases to the predetermined value, a mode is selected in which charging/discharging currents are controlled so as to hold the SOC value at a given value. In addition, the power supply controller 12 notifies the vehicle controller 8 about information that control mode and/or charging/discharging current limit values are changed. Correspondingly, the vehicle controller 8 switches from the EV drive mode to the HEV drive mode so that the vehicle is driven by both the battery and the engine. In the HEV drive mode, charging/discharging currents are controlled so that SOC falls within a given range that has its center at the given value. If SOC decreases and reaches a predetermined minimum control value, a discharging operation disabled mode is selected so that the discharging operation is disabled.

2. Battery Pack 10

The battery pack 10 can be composed of a plurality of base batteries (battery cells) as rechargeable batteries that are connected to each other in series and/or in parallel. Lithium ion batteries, nickel-hydrogen batteries, nickel-cadmium batteries or the like can be suitably used as rechargeable batteries. Also, in addition to these types of batteries, charge storage elements such as electric double layer capacitors can be used as electric power storage elements. In this specification, the battery pack can include these types of electric power storage elements.

In the embodiment shown in FIG. 2, the battery pack 10 is composed of a number of base batteries connected to each other in series. The base batteries are thermally coupled to a temperature sensor(s) so that a temperature signal(s) detected by the temperature sensor(s) is/are sent to the power supply controller 12. The temperature sensors can be arranged on all of the base batteries. Alternatively, a temperature sensor(s) may be arranged on one of or some of the base batteries to representatively detect the battery temperature. The battery pack 10 is connected to the inverter 5 via a contactor. A precharging resistor and the contactor are connected to the positive terminal of the battery pack 10. In this embodiment, the inverter 5 is provided on the vehicle main unit side. However, the inverter may be provided on the power supply device side. The inverter 5 converts DC electric power from the battery pack 10 into AC electric power, and provides the converted electric power to the electric motor 3.

The battery pack 10 is connected to an externally-connecting switch SW that allows the battery pack 10 to be electrically connected to an external charging device CD. When the vehicle CA is at rest, the externally-connecting switch SW can be closed (turned ON) so that the battery pack 10 can be charged by the external power source. After the battery pack is charged, the externally-connecting switch SW can be opened (turned OFF). After that, the external charging device CD can be disconnected from the power supply device 100. Commercial power, a charging station, and the like can be used as the external charging device CD. A typical example of the vehicle can be provided by a plug-in hybrid car that can be charged by single-phase commercial power for home use. The power supply device 100 thus stores electric power in the battery pack 10, and provides the stored electric power for driving the vehicle.

The power supply controller 12 shown in FIG. 2 includes a temperature sensor input receiving portion, a voltage sensor input receiving portion, a current sensor input receiving portion as the current detecting portion 14, a battery capacity calculating portion 15, the charging/discharging control portion 13, and a power supply side communicating portion 16 as a communication interface. The temperature sensor input receiving portion receives output from the temperature sensor which is thermally coupled to the battery pack 10. The voltage sensor input receiving portion receives sensor output from a battery voltage sensor. The current sensor input receiving portion receives sensor output from a current sensor. The battery capacity calculating portion 15 calculates the battery remaining capacity. The charging/discharging control portion 13 controls charging/discharging operation of the battery pack 10. The power supply side communicating portion 16 communicates with the vehicle controller 8.

3. Battery Capacity Calculating Portion 15

The battery capacity calculating portion 15 continuously estimates the charged state (SOC: State Of Charge) of the storage batteries. SOC can be represented by an absolute value (unit [A-h], etc.) of the charged amount of the battery pack, or a ratio (0 to 100%) of the charged amount relative to the charge capacity of the battery pack. In this embodiment, the battery capacity calculating portion 15 sequentially calculates SOC based on the integrated value of the charged/discharged amounts of the battery pack. The integrated value of the charged/discharged amounts can be obtained by integrating product values of battery voltages and battery currents of the battery pack over time.

4. Charging/Discharging Control Portion 13—Control Mode

The charging/discharging control portion 13 adjusts the charging/discharging currents flowing in the battery pack 10 to a value not more than the charging/discharging current limit values. The charging/discharging control portion 13 compares a predetermined remaining capacity with the remaining capacity calculated by the battery capacity calculating portion 15, and switches between control modes. The charging/discharging current limit values are changed depending on the control modes. This control is now described with reference to the graph showing limits and the flowchart of FIG. 4.

It is first determined in Step S1 whether the remaining capacity (i.e., SOC) is higher than a control upper limit of the battery pack. If SOC is higher than the control upper limit, the procedure goes to Step S1-2, and a charging operation disabled mode is selected in which the charging operation is disabled. In this case, the charging/discharging operation is stopped, and it is determined that a battery abnormality has occurred. In addition, for example, a warning sign is displayed, or service request is issued.

If SOC is not higher than the control upper limit, the procedure goes to Step S2, and it is determined whether SOC is lower than a control lower limit. If SOC is not higher than the control lower limit, the procedure goes to Step S2-2, and the discharging operation disabled mode is selected in which the discharging operation is disabled, and the procedure ends.

If SOC is higher than the control lower limit, the procedure goes to Step S3, and it is determined whether SOC gets beyond a range in proximity to a target state value, more specifically it is determined whether SOC is lower than the upper limit (target state value+$\alpha$, hereinafter referred to as range upper limit) of a given range having its center at the target state value (a range of target state value±$\alpha$). If SOC is higher than the range upper limit, the procedure goes to Step S3-2, an allowance mode is selected that allows a discharging amount to exceed a charging amount in a predetermined period. In this mode, since a discharging amount is allowed to exceed a charging amount, SOC will gradually decrease.

If SOC falls out of the range in proximity to the target state value, the procedure goes to Step S4, and a restriction mode is selected in that the charging/discharging current limit values are reduced so that the remaining capacity is held within the given range having its center at the target state value (from the range upper limit to the range lower limit), and charging/discharging currents are restricted so as not to exceed these limit values.

FIG. 3 is the graph showing SOC time variation resulting from control mode selection. As shown in this figure, the battery pack is previously charged before the vehicle is driven. The battery pack is charged by an external charging device CD with the externally-connecting switch SW being ON. The battery pack may be charged by an electric generator of the vehicle in case of an emergency.

When SOC reaches the control upper limit so that the battery pack is fully charged, charging operation is disabled. After that, the vehicle is driven. When SOC becomes lower than the control upper limit, the allowance mode is selected. In the allowance mode, a discharging amount is allowed to exceed a charging amount. Specifically, charging/discharging operation is controlled so that the integrated value of discharging amounts is allowed to exceed the integrated value of charging amounts in a predetermined period. Alternatively, charging/discharging operation can be controlled so that the time variation amount of a discharging current is larger than the time variation amount of a charging current in the allowance mode. Alternatively, charging/discharging operation can be controlled so that the time variation amount of the discharging current in the restriction mode is smaller than the time variation amount of the discharging current in the allowance mode. This allowance mode can correspond to the EV drive mode in that the vehicle is mainly driven by the power supply device.

After that, when it is detected that SOC has become low, more specifically, when it is detected that SOC has become not higher than the range upper limit, the EV drive mode is switched to the HEV drive mode so that the discharging current amount is suppressed. Accordingly, the battery pack can be prevented from being over-discharged. Therefore, it is possible to reduce any adverse effect on the battery pack. In addition, the power supply device informs the vehicle side that the control modes are switched from one to another or charging/discharging currents are restricted to the charging/discharging current limit values. Correspondingly, the vehicle side can select a mode that appropriately controls driving operation of the electric motor and the engine. As a result, the EV drive mode and the HEV drive mode can be appropriately switched from one to another at appropriate timing in so-called plug-in hybrid cars. Therefore, the battery pack can be reliably used for the long term.

The control upper limit can be not less than 80% of the fully-charged capacity of the battery pack, 20 to 60 Ah or the like in consideration of the type, the number, the connection type and the like of the batteries used. Although the target state value can be determined in consideration of battery conditions and the like, it is preferable that the target state value be a value not more than 50% of the fully-charged capacity of the battery pack or 2 to 10 Ah. In this case, drive modes can be selected to keep SOC at about 50%, which is suitable particularly to an HEV drive mode. Therefore, this power supply device is effective for EV/plug-in control. The control upper and lower limits, and the target state value can be defined by relative values. For example, the predetermined target value can be 5 to 30, preferably 8 to 20 where the control lower limit and the control upper limit are defined as 0 and 100, respectively. For example, the given range having its center at the predetermined target value can be defined by ±$\alpha$ ($\alpha$ can be 5 to 10% of SOC), by a range of 1 to 5 Ah, or the like.

The aforementioned power supply device can be used as a battery system for vehicles. The power supply device can be installed on electric vehicles such as hybrid cars that are driven by both an engine and an electric motor, and electric vehicles that are driven only by a motor. The power supply device can be used as a power supply device for these types of vehicles.

Figure 6:
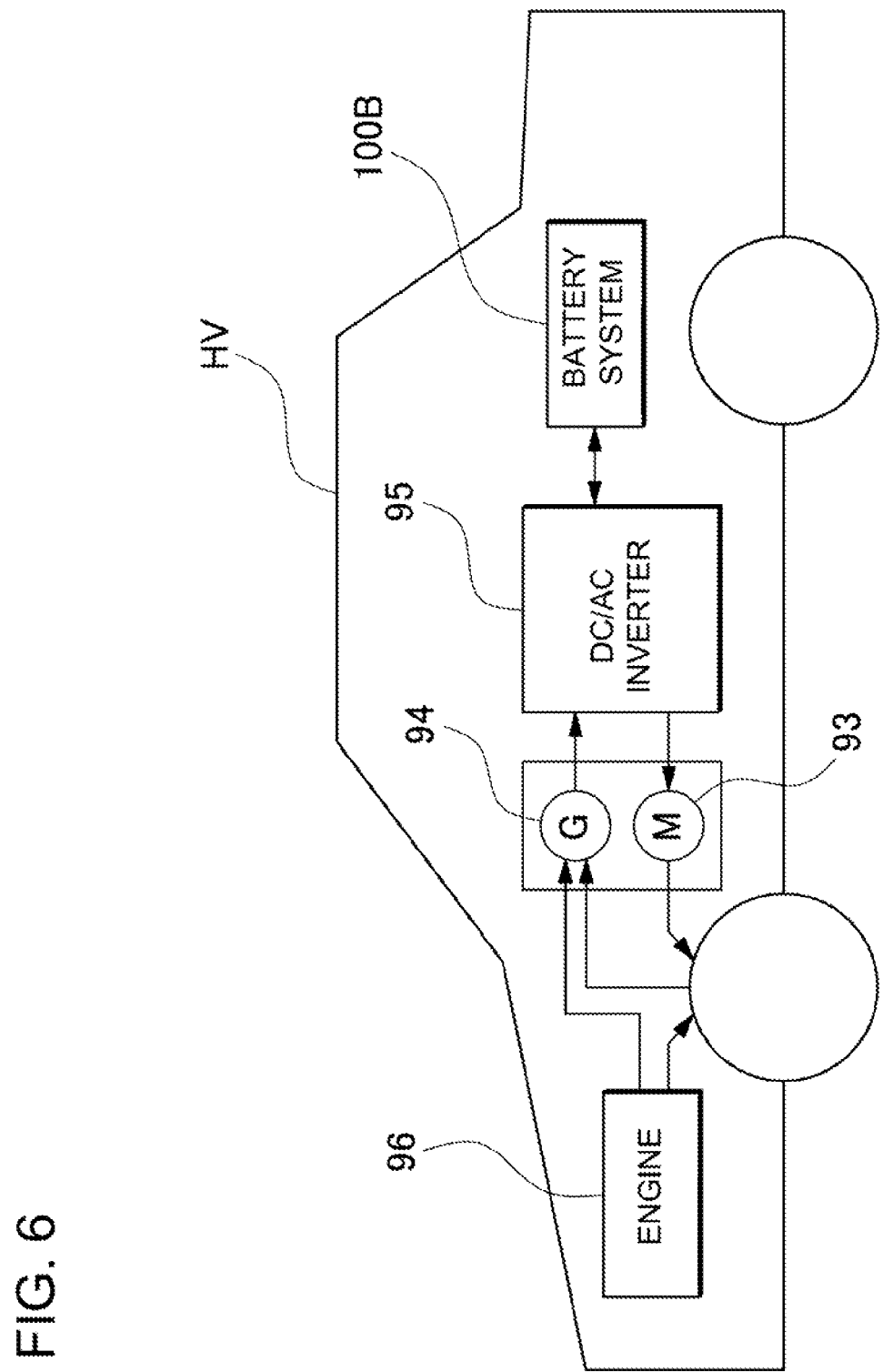
FIG. 6 is a block diagram showing an exemplary hybrid car that is driven by an engine and an electric motor, and includes the power supply device.

FIG. 6 is a block diagram showing an exemplary hybrid car HV that is driven both by an engine and an electric motor, and includes the power supply device. The illustrated vehicle HV with the power supply device includes an engine 96 and an electric motor 93 that drive the vehicle HV, a battery system 100B that supplies electric power to the electric motor 93, and an electric generator 94 that charges batteries of the battery system 100B. The battery system 100B is connected to the electric motor 93 and the electric generator 94 via a DC/AC inverter 95. The vehicle HV can be driven both by the electric motor 93 and the engine 96 with the batteries of the battery system 100B being charged/discharged. The electric motor 93 is energized and drives the vehicle in a poor engine efficiency range, e.g., in acceleration or in a low speed range. The electric motor 93 is energized by electric power supplied from the battery system 100B. The electric generator 94 can be driven by the engine 96 or by regenerative braking when users brake the vehicle so that the batteries of the battery system 100B are charged.

Figure 7:
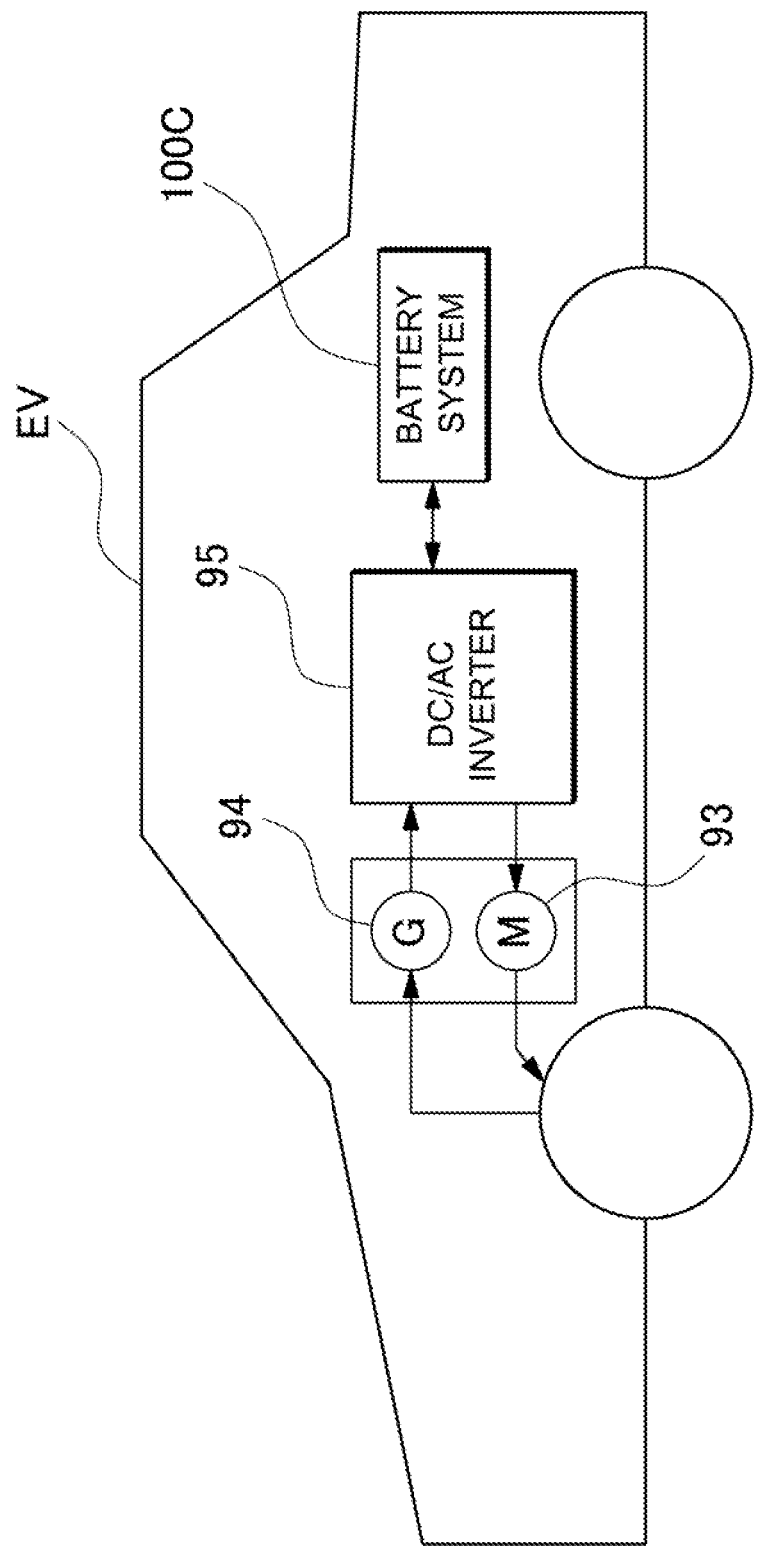
FIG. 7 is a block diagram showing an exemplary electric vehicle that is driven only by an electric motor, and includes the power supply device.
Figure 8:
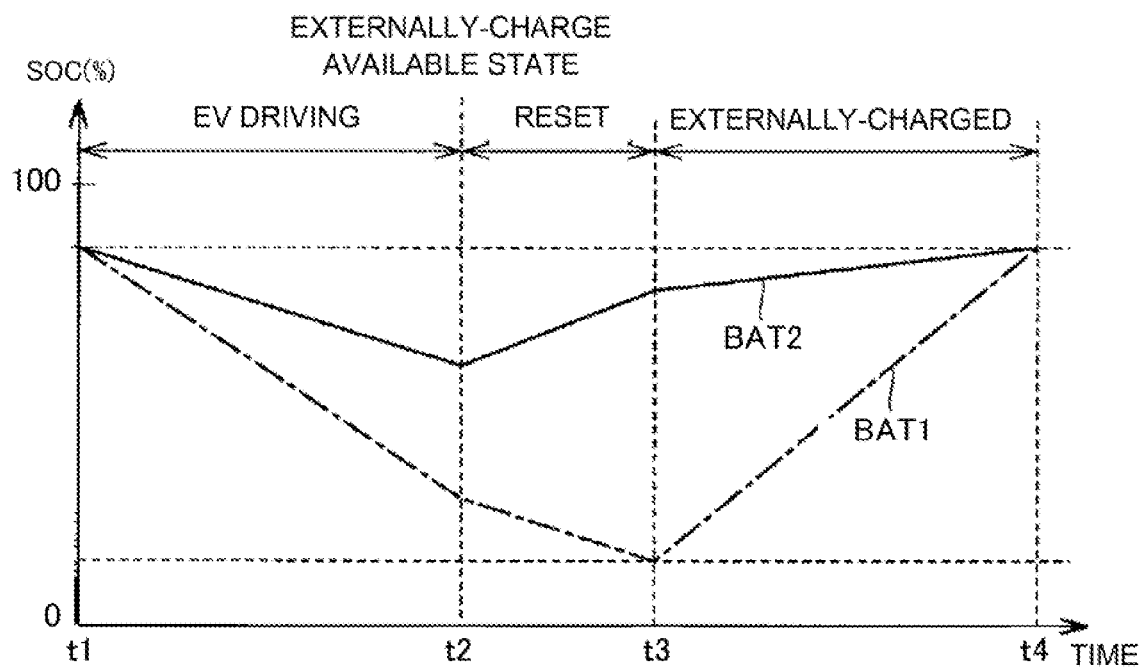
FIG. 8 is a graph showing exemplary known SOC time variation.

FIG. 7 shows an exemplary electric vehicle EV that is driven only by an electric motor, and includes the power supply device. The illustrated vehicle EV with the power supply device includes an electric motor 93 that drives the vehicle EV, a battery system 100C that supplies electric power to the electric motor 93, and an electric generator 94 that charges batteries of the battery system 100C. The electric motor 93 is energized by electric power supplied from the battery system 100C. The electric generator 94 can be driven by vehicle EV regenerative braking so that the batteries of the battery system 100C are charged.

A power supply device and a method for controlling charging/discharging operation of a power supply device according to the present invention can be suitably applied to charging/discharging control in plug-in hybrid vehicles and hybrid electric vehicles that can switch between the EV drive mode and the HEV drive mode, electric vehicles, and the like. It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2009-239,522 filed in Japan on Oct. 16, 2009, the content of which is incorporated herein by reference.

What is claimed is:

1. A power supply device comprising:
a rechargeable battery pack;
a charging/discharging control portion that controls charging/discharging operation of the battery pack;
a current detecting portion that detects charging/discharging currents flowing in the battery pack; and
a battery capacity calculating portion that estimates the remaining capacity of the battery pack based on the charging/discharging currents detected by the current detecting portion,
wherein the charging/discharging control portion is configured to select one of a plurality of control modes, the charging/discharging operation being controlled based on the selected control mode, the control modes comprising:
a charging operation disabled mode for disabling the charging operation when the remaining capacity estimated by the battery capacity calculating portion is higher than a predetermined control upper limit;
a discharging operation disabled mode for disabling the discharging operation when the estimated remaining capacity is lower than a control lower limit, the control lower limit being specified lower than the control upper limit; and,
a charging/discharging mode for the charging/discharging operation when the estimated remaining capacity is between the control upper limit and the control lower limit, wherein the charging/discharging mode further comprises:
an allowance mode where the charging/discharging control portion is configured to control the charging/discharging current limit values to allow a discharging amount to exceed a charging amount in a predetermined period when the estimated remaining capacity is higher than a range upper limit of a given range, the given range being defined by the range upper limit and a range lower limit predetermined in a state of a charging, the allowance mode being conducted until the estimated remaining capacity being beyond the given range drops to a target state value or lower, the target state value being defined at a center of the given range, and
a restriction mode where the charging/discharging currents are restricted to hold the remaining capacity within the given range when the estimated remaining capacity is lower than the range upper limit of the given range,
wherein an excess discharge allowed range in the state of charge that corresponds to the allowance mode for the charging/discharging operation is higher than the given range applied for the restriction mode.

2. The power supply device according to claim 1, wherein the charging/discharging control portion adjusts the charging/discharging current limit values in the allowance mode to current values that allow the integrated value of the discharging current in the predetermined period to exceed the integrated value of the charging current.

3. The power supply device according to claim 1, wherein the charging/discharging control portion controls charging/discharging operation so that the time variation amount of the discharging current is larger than the time variation amount of the charging current in the allowance mode.

4. The power supply device according to claim 1, wherein the charging/discharging control portion controls charging/discharging operation so that the time variation amount of the discharging current in the restriction mode is smaller than the time variation amount of the discharging current in the allowance mode.

5. The power supply device according to claim 1 further comprising a power supply side communicating portion that transmits the charging/discharging current limit values based on the remaining capacity of the battery pack estimated by the battery capacity calculating portion to a device side to be provided with electric power.

6. The power supply device according to claim 1 further comprising an externally-connecting switch that can electrically connect the battery pack to an external charging device.

7. The power supply device according to claim 1, wherein the power supply device is a vehicle power supply device, wherein the allowance mode is an EV drive mode, and the restriction mode is an HEV drive mode.

8. The power supply device according to claim 1, wherein the control upper limit is not less than 80% of the fully-charged capacity of the battery pack.

9. The power supply device according to claim 1, wherein the target state value is not more than 50% of the fully-charged capacity of the battery pack.

10. The power supply device according to claim 1, wherein the restriction upper limit is 20 to 60 Ah.

11. The power supply device according to claim 1, wherein the target state value is 2 to 10 Ah.

12. The power supply device according to claim 1, wherein:
- the charging/discharging control portion is configured to maintain the allowance mode even when the estimated remaining capacity drops to the range upper limit of the given range; and
- the charging/discharging control portion is configured to switch the allowance mode to the restriction mode when the estimated remaining capacity drops from a point beyond the given range to the target state value or less in the given range.

* * * * *